United States Patent [19]

Williams et al.

[11] 3,731,563

[45] May 8, 1973

[54] HYDROSTATIC SPOOL BEARING FOR USE IN TRACER ASSEMBLY OF PATTERN CONTROLLED MACHINE

[75] Inventors: Alan F. Williams, Palo Alto; Edward H. Phillips, Los Altos, both of Calif.

[73] Assignee: Tydeman Machine Works, Inc., Redwood City, Calif.

[22] Filed: Nov. 4, 1971

[21] Appl. No.: 195,883

Related U.S. Application Data

[62] Division of Ser. No. 859,985, Sept. 22, 1969, abandoned.

[52] U.S. Cl. ................. 82/14 A, 90/62 R, 33/23 K, 251/3, 308/5 R
[51] Int. Cl. ............................................. B23b 3/28
[58] Field of Search .................. 90/62 R, 13 R, 13.4; 82/14 A, 14 R; 251/3; 308/5 R; 33/23 K, DIG. 2

[56] References Cited

UNITED STATES PATENTS

| | | | |
|---|---|---|---|
| 3,482,232 | 12/1969 | Farrand et al. | 308/5 R X |
| 3,145,597 | 8/1964 | Tydeman | 82/14 A |
| 2,735,342 | 2/1956 | Glaser | 90/62 R |

*Primary Examiner*—Gil Weidenfeld
*Attorney*—Fryer, Tjensvold, Feix, Phillips & Lempio

[57] ABSTRACT

A spool bearing for cartridge spindles and the like has a hollow tubular barrel with a central fluid inlet and a spool shaft mounted in the hollow barrel for rotation. The spool shaft has a relieved central portion adjacent to the fluid inlet into the barrel and a pair of stepped lands on its opposite ends whereby pressurized fluid from the inlet will flow generally in an axial direction over the lands at opposite ends of the spool shaft and support it on a fluid film bearing within the barrel. A hydrostatic thrust bearing can be incorporated on one end of the spool shaft for resisting the axial loadings induced on the shaft spool by tools mounted on its other end.

2 Claims, 7 Drawing Figures

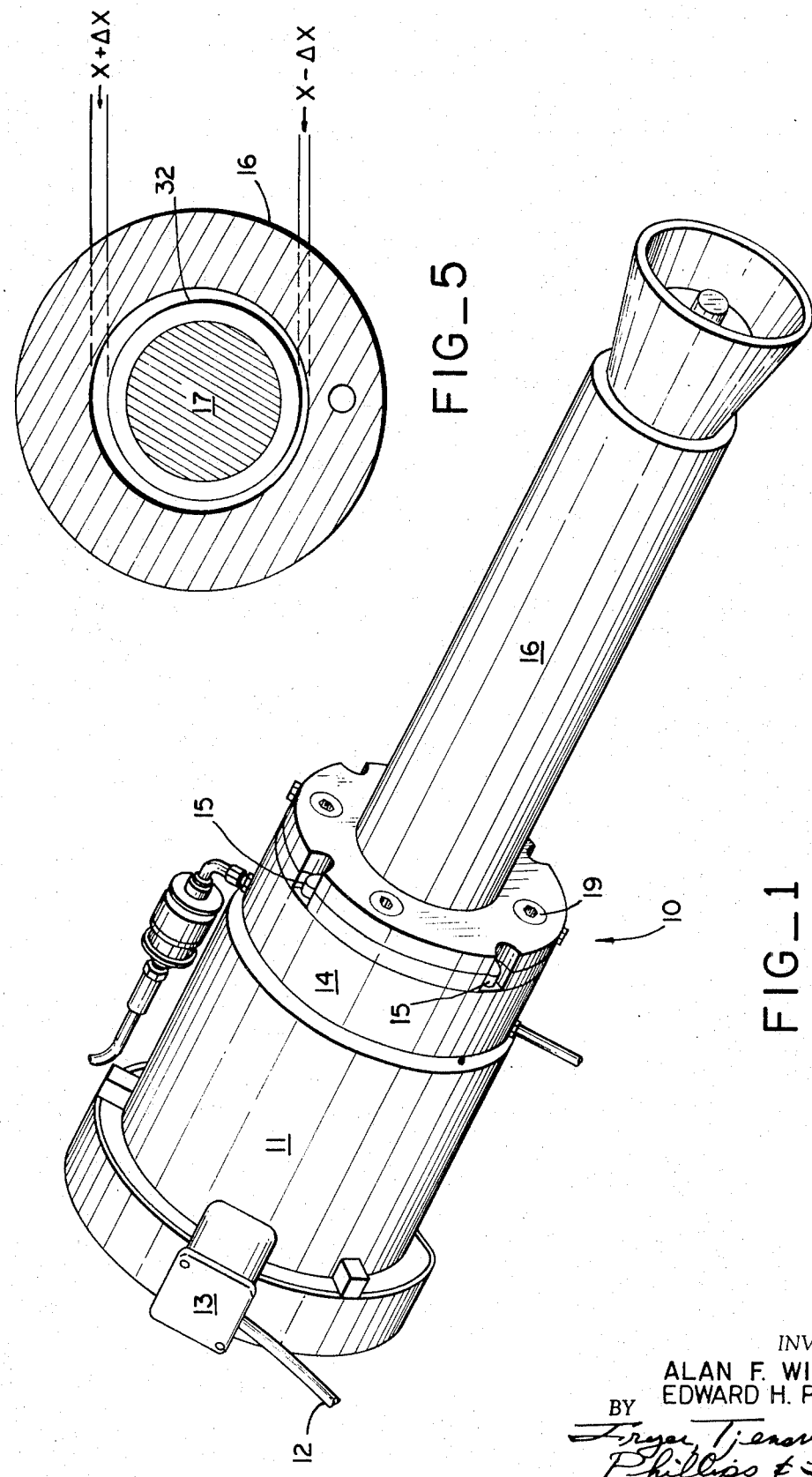

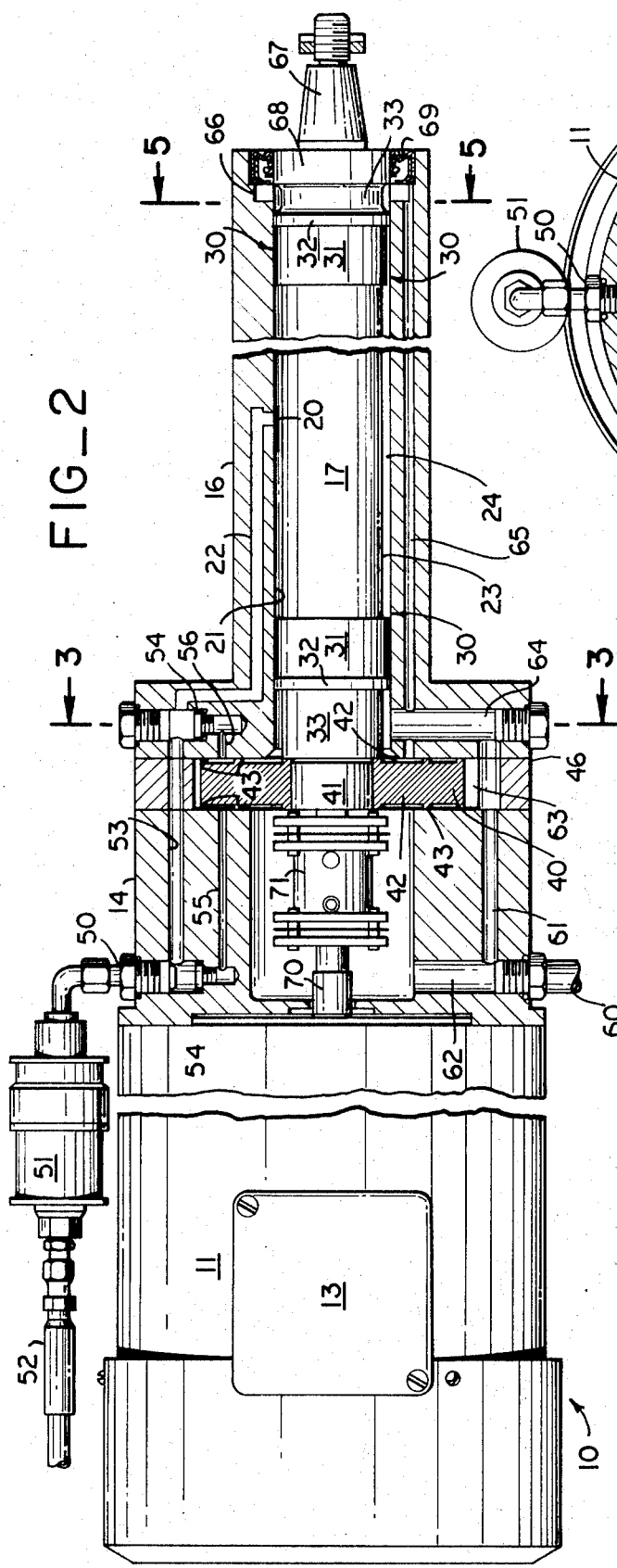
FIG_2
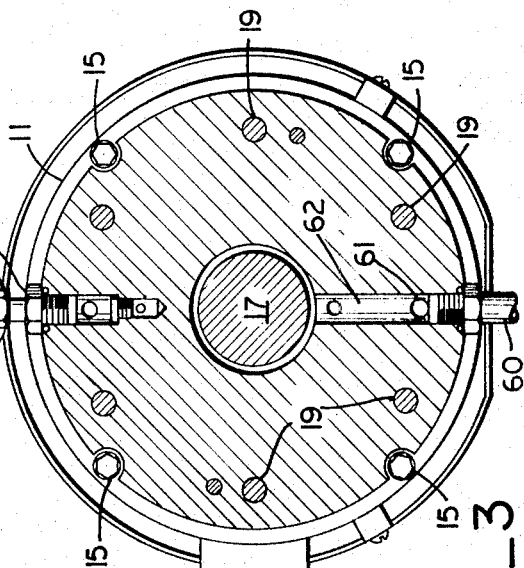
FIG_3
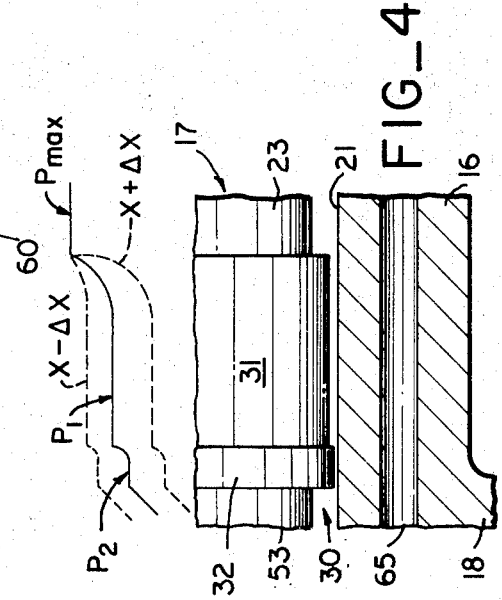
FIG_4
INVENTORS
ALAN F. WILLIAMS
EDWARD H. PHILLIPS
BY Fryer, Tjensvold, Feix, Phillips & Lempio
ATTORNEYS

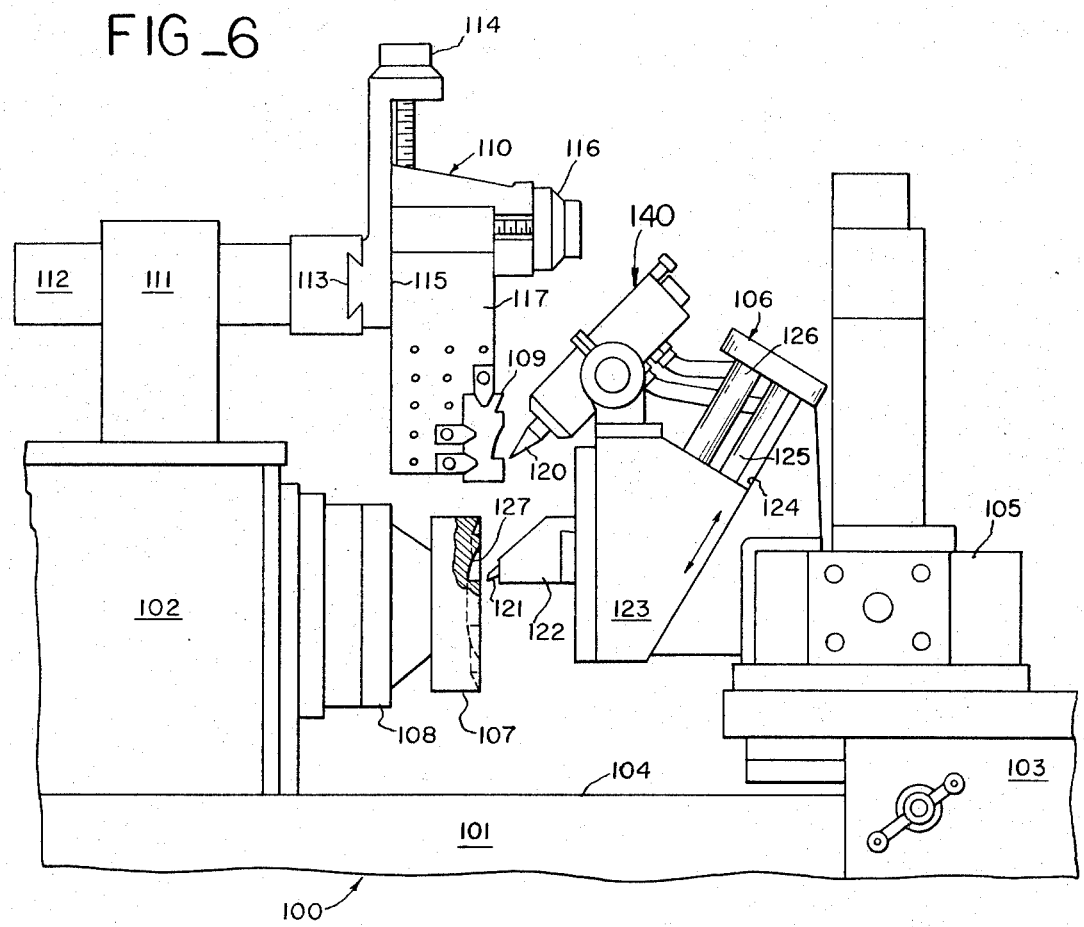
FIG_6
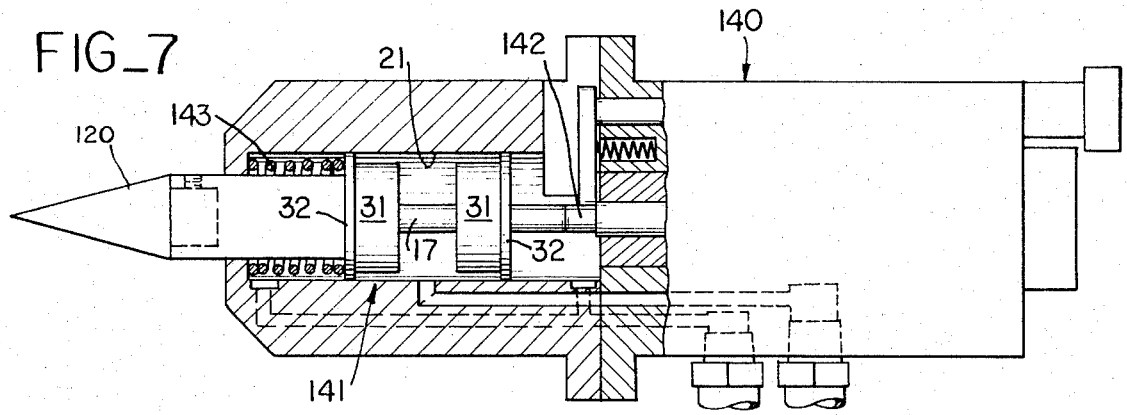
FIG_7

HYDROSTATIC SPOOL BEARING FOR USE IN TRACER ASSEMBLY OF PATTERN CONTROLLED MACHINE

This is a division of Ser. No. 859,985, filed Sept. 22, 1969 now abandoned.

BACKGROUND OF THE INVENTION

Currently the trend in machine tooling design is toward the hydrostatic bearings because of the many advantages of these types of bearings which offset their higher initial cost. High stiffness and good load distributions are characteristics of these bearings which also provide an inherent error-correcting feature which allows the hydrostatic bearing to compensate for bearing surface inaccuracies, such as out of roundness, non-parallelism, etc. In addition, virtual elimination of bearing friction reduces power requirements and eliminates the wear problems experienced with conventional ball and roller bearings. Further, the oil-film damped hydrostatic bearing allows superior surface finishes to be obtained in grinding operations thereby eliminating some of the costly subsequent finishing operations for up-grading ground surface finishes.

With the increasing sophistication of current day machine tool designs performance that was undreamed of ten years ago is commonplace. These machines provide more precise and more-difficult-to-machine components at a faster rate and at greater cost savings than their contemporary machines. To achieve these capabilities in machine tool designs, hydrostatic bearings are often employed.

Such hydrostatic bearings are essentially a system composed of the bearing and a fluid supply of system which provides, through a complex distribution system pressurized fluid to the bearing which is recirculated after "flowing" through the bearings. Because of the necessity of providing the external fluid supply system, the cost of hydrostatic bearings has remained relatively high in comparison to conventional bearings and, as a result, they have only been employed in limited and special applications wherein conventional bearings are unsuitable or do not have the capabilities required.

While the overall cost of conventional hydrostatic bearings remain high, some cost savings are possible since there is no metal-to-metal contact in the bearing which relaxes the requirement for close tolerance machining during bearing fabrication and also allows the use of materials in the bearing component parts which have poor wear characteristics. Further, the elimination of wear in the bearing avoids the necessity of expensive overhaul and down time and also a reduction set up time, all of which represent an ultimate saving in the utilization of hydrostatic bearings which helps offset their higher initial cost. Some maintenance is required on the fluid supply system which is employed with these bearings but with the advent of more reliable fluid supply systems, these costs have decreased sufficiently where hydrostatic bearings may be considered for many additional applications.

Conventional hydrostatic bearings consist of a pad which supports the runner (movable or non-movable) above the pad on the film of pressurized fluid. This hydrostatic pad conventionally includes a recess surrounded by a sill structure with a fluid inlet in the recess. In operation, the fluid inlet is connected to a source of pressurized fluid through a restricter (compensating element) and the pressurized fluid entering the recess supports the runner above the pad on a thin film of fluid while allowing a portion of the pressurized fluid through flow across the sill to drain areas. Thus, in these bearings it is necessary to continuously provide replenishing fluid to the recess to maintain the supporting film pressure therein. Obviously, in these systems the leakage across the sill cannot be a rate greater than the supply rate to the recess since in such a situation the runner will be supported on an inadequate film thickness.

These conventional hydrostatic bearings are often employed to support rotating shafts or slide ways in a machine tool. In the former case, such as a hydrostatic headstock, the shaft is supported by a plurality of pads, usually sets of three or more, symetrically disposed about the shaft in a radial plane. Two or more of these sets may be employed to support the shaft and each pad includes an outer sill surface which conforms to the curved surface of the shaft so that the leakage rate across the sill can be controlled. Normally, in even the simplest hydrostatic shaft support system, six or more of the hydrostatic bearing pads will be employed.

Machining the pads on the curved surfaces of the supporting structure is expensive and to some extent prevents the application of these bearing systems in smaller sized shaft system. However, employing a cantilevered spindle design disclosed in my co-pending application entitled "Hydrostatic Spindle" Ser. No. 818,364 some of the costs of machining can be reduced since the pockets are milled directly on the outer surface of a stationary shaft which is easily accessible.

In all the prior designs, each pad must employ suitable restricter (compensating element) in its connection to a common fluid supply manifold in order for the "-sets" bearings to work properly. Thus, the necessity for the compensating elements and the cost of machining the necessary manifold passageways in the fluid supply distribution system are some of the factors in making conventional hydrostatic bearings expensive.

An object of this invention is to provide a new type of spool bearing system for shafts which eliminate conventional pad and runner constructions, as well as conventional restricters (compensating elements).

Another object is to supply inexpensive, unitary, compact bearing systems for employment with shafts in cartridge spindles employed in grinding operations and the like.

Another object is to provide a closed system hydrostatic bearing for a shaft system.

A further object is to reduce the complexity and the necessity for a large number of machining operations in the fabrication of hydrostatic bearings in shaft systems.

It is also an object to provide a simpler, more reliable hydrostatic bearing system for rotating the shaft systems.

Another object is the provision of a hydrostatic bearing design which can be employed in very small diameter rotating shaft systems, i.e., those having a diameter of one-half inch or less.

A further object is to provide an improved hydrostatic spool bearing for reciprocating sensing or tracing elements in tracer lathe assemblies.

Other objects and advantages of the instant invention will become apparent from the description of the invention which follows.

SUMMARY OF THE INVENTION

The above objects and advantages are accomplished in a hydrostatic spool bearing system which includes a hollow tubular barrel having a pressurized fluid inlet in its central portion; a spool shaft mounted in said barrel, said spool shaft having a relieved central section and at least two stepped circular lands on each side of said relieved central portion whereby pressurized fluid entering said barrel through said fluid inlet can flow generally axially along said spool shaft to drain areas outboard of said lands at each end thereby supporting said spool shaft on a film of fluid; and a fluid supply source connected to said inlet to supply pressurized fluid thereto. A drive motor can be connected to rotate said spool shaft through a flexible coupling. A disc with a double-acting hydrostatic thrust bearing may also be incorporated on one end of the spool shaft to absorb axial thrust loadings in both directions when it is employed as a journal for a spindle.

BRIEF DESCRIPTION OF THE DRAWINGS

FIG. 1 is a perspective of a cartridge spindle in which the novel hydrostatic bearing system can be employed;

FIG. 2 is a partial longitudinal section through the cartridge spindle illustrated in FIG. 1;

FIG. 3 is a radial section along line 3—3 of FIG. 2;

FIG. 4 is a broken-away portion of the spool shaft and barrel in a location near the disc thrust bearing;

FIG. 5 is a section along line 5—5 of FIG. 2;

FIG. 6 illustrates a tracer lathe assembly in which the hydrostatic spool bearing is used as the supporting bearing for the sensor or tracer element; and FIG. 7 is a section through spool bearing and sensor or tracer assembly shown in FIG. 6.

BRIEF DESCRIPTION OF A PREFERRED EMBODIMENT

In FIG. 1 a cartridge spindle 10 is illustrated which is a preferred embodiment for employing the instant spool bearing. The principle components of this spindle include a drive motor 11 which is connected to a suitable source of electric power via line 12 through its junction box 13, a circular base 14 which is attached to the motor with bolts 15 and a hollow barrel 16 plus a rotating shaft 17 between which the new hydrostatic spool bearing is utilized. A grinding wheel 18 is the tool mounted on the shaft arbor in the instant illustration.

Utilization of this hydrostatic spool bearing in a cartridge spindle unit illustrates its compact design and represents one of the many small diameter hydrostatic bearings that can be built employing the current invention. The hydrostatic spool bearing was specifically designed for small spindle applications, such as that illustrated in the drawings, to replace conventional mechanical bearings without any appreciable increase in cost. Employment of the spool bearings provides superior capabilities in these cartridge spindles since spindles employing spool bearings will have high load carrying capacity at all speeds from zero to maximum rpm that will often exceed those of the lower capacity contemporary mechanical bearings. High rigidity and vibration free rotation allowing grinding within five millionths of an inch T.I.R. is another feature of these spindles along with their unlimited service life. Such features have not been available previously in small diameter cartridge spindles; i.e., those having a diameter of three inches and under, since the space requirements of machining the conventional hydrostatic bearing pads and runners have made the costs of employing such bearings in small diameter spindles prohibitive.

The instant invention is particularly useful in small diameter rotating shaft systems, such as cartridge spindles, but it is not intended that it be limited thereto. Further, it is described with reference to a cartridge spindle unit by way of illustration and not of limitation.

In FIG. 2 the internal construction of a hydrostatic spool bearing is more completely detailed in section. As can be seen, the barrel 16 is a hollow tubular member in the spindle embodiment, and includes a flange 18 at one end which is secured to a cylindrical base 14 with bolts 19. Opening into the internal wall of the tubular member is an inlet port 20 located in its central portion which communicates with the bore 21 of the barrel and is connected, through passage 22, to a source of pressurized fluid to supply the bore of the barrel with pressurized fluid.

Shaft 17 is placed in the bore so that its central relieved portion 23 is disposed in the vicinity of the inlet port 20, and so that its paired stepped lands at its opposite ends straddle this inlet port. Generally, the clearance between the relieved center portion of the spool and the wall of the bore is not critical so long as it allows an adequate volume of pressurized fluid to flow through the bearing areas to meet the flow requirements. Pressurized fluid entering the cylindrical space 24 between the wall of the bore and the relieved center section moves toward both ends of the spool bearing where it egresses over the pair of stepped lands located on opposite sides of the relieved center portion of the spool bearing.

Diametric clearances between the lands and the bore of the barrel as well as the construction of the lands is very important in the fabrication of the novel hydrostatic spool bearing. Normally, the bore of the barrel will have a uniform diameter and a smooth surface finish.

Since both ends of the spool bearing are essentially the same, the bearing area 30 of only one end of the spool bearing will be described in detail. However, is must be appreciated that the bearing requires two bearing areas, one located on opposite sides of the fluid inlet port as indicated above. In FIG. 4 an enlarged portion of the rear bearing area 30 is shown. It includes an inner land 31 and an outer land 32. The area outboard of the outer land is relieved to form a drain area 33 from which the fluid can be vented to a reservoir for recirculation. The axial length of the inner land is from 2 to 9 times longer than the axial length of the outer land. In the hydrostatic spindle environment having approximately a three inch outer diameter (O.D.), the ratio of 5 to 1 was found to give satisfactory performance. The outer lands have the largest diameter which is always greater than the diameter of the inner lands, while the inner lands always have a greater diameter than the relieved central portion of the spool bearing. Usually the diametric clearances for the inner lands will be approximately one to three times greater than those employed with the outer lands. The importance of this construction will be more fully detailed later in the specification.

In an exemplary three inch O.D. cartridge spindle barrel unit, the uniform bore diameter will be approximately 1.6250 plus or minus 0.00005 inches with the outer land having a diameter of 1.6242 plus or minus 0.00005 inches and the inner lands having a diameter of 1.6234 plus or minus 0.00005 inches, which is approximately twice the clearance between the outer land and the wall of the bore. The axial length of the outer lands in this spindle cartridge was approximately one-fourth inch wide and the axial length of the inner lands measured 1-7/16 inch, which is approximately five times the length of the outer lands. Of course the axial clearances and the relative lengths of the stepped lands will vary relative to one another, depending upon the design, stiffness requirement, operating speeds, and similar parameters.

The importance of the paired stepped lands at each end of the spool bearings can be appreciated by referring to FIGS. 4 and 5. While it has been indicated that compensating elements are not required for the spool bearings, it should be understood that, in effect, the stepped land design is a type of compensator. This can be more fully appreciated by referring to the pressure patterns illustrated in FIG. 4 which corresponds to the theoretical pressure curves for various locations along the bearing areas 30 as indicated. The system pressure is present in the reduced central area 23 of the spool and is Pmax which is supplied through inlet port 20. It is a uniform pressure and the pressure which is maintained by the relief valve setting in the fluid supply system (not shown). As the fluid bleeds from the cylindrical space 24 between the bore wall and the relieved central portion of the spool over the step formed between this portion and the inner land, a first pressure drop occurs. This lower pressure is referred to as $P_1$. This pressure, assuming the spool is centered, will be uniform around the inner land. A second pressure drop, to $P_2$, occurs as the fluid bleeds across the step between the inner and outer lands after which the fluid is vented to drain in the relieved drain area 33.

In operation, if the spool is not centered in the bore so that the clearances are uniform around the lands, the spool will be urged to return to its centered position by unequal pressures. Assuming the clearance between the outer land and the bore is X, with the spool centered, if the spool is displaced off its centered position the diametrical clearances will change in one area to X plus delta X and in the area diametrically opposite to X minus delta X. As a result, pressure curves will change to those indicated by the broken lines in FIG. 4 and labeled as X plus delta X and X minus delta X. These pressures will occur since the increase clearance in one area will allow the fluid to bleed faster across the several lands in this area while the decreased clearance in diametrically opposite area will decrease the flow of fluid causing a pressure build toward the system pressure, as indicated in the pressure pattern. As a result of the unequal pressures, the spool bearing will be urged in a direction to re-establish the uniform clearance circumferentially about the outer and inner lands.

From the above description it is clear that the above relationship of the relative clearances between the adjacent pairs of lands and the bore at each end of the spool bearing is important and that these clearances are critical for proper operation of the spool bearing.

Further, it can be appreciated that the pressure patterns will cause the spool to be self-righting when an adequate system pressure level is established for supporting the spool bearing within the barrel. Of course the diameter of each outboard land must be greater than its adjacent inner land for proper operation of the spool bearing.

It should also be appreciated that the locus of the several pairs of stepped lands at opposite ends of the spool bearing is not critical so long as the inlet port 20 is located between these several pairs of lands.

Thus, the spool bearing can be used as a suitable bearing in an axial displacement system as well as rotating shaft systems. One excellent axial displacement application for this spool bearing is in a bearing for a tracer unit for machine tools where the spool provides a bearing for the reciprocating tracing member which tracks on a pattern surface. Since the spool is self-righting, the side loadings on the bearing induced from tracing the pattern will be compensated for by the bearing. In fact, very accurate tracings can be accomplished in using this bearing in tracer units.

In the embodiment illustrated in the drawings, the spool bearing is employed in a rotating shaft system of a cartridge spindle. In this application a thrust bearing is also desirable to compensate this for axial loadings placed on the rotating shaft from tools mounted on its arbor end.

To provide a compact hydrostatic thrust bearing, a thrust disc 40 is assembled on the driven end 41 of the shaft 17 and secured thereon against relative axial and rotational movement. This disc is relieved on its opposite radial faces 42 to form pairs of spaced apart circular sills 43 on each face. The outer face of flange 18 of the barrel which is secured to the base, is surfaced to provide one bearing surface 44 for the thrust bearing and an opposite surface 45 on the base 14 is likewise surfaced to provide the other bearing surface, as illustrated in FIG. 2. When the flange of the barrel is attached to the base with bolts 19, a circular spacer 46 is placed between the flange and the base to provide the proper spacing for the thrust disc. The radial faces containing the raised circular sills of the disc are arranged to be closely adjacent to an associated bearing surface. The clearance between each pair of circular sills and their adjacent surface, with the disc centered, is about 0.0005 plus or minus 0.00005 inches.

To operate the novel hydrostatic spool bearing described above, along with the thrust bearing, it is necessary to provide pressurized hydraulic fluid to the system. In the instant embodiment, a supply system having a supply pressure of 600 psi is suitable. This fluid supply system (not shown) is connected to a fluid inlet 50 through a filter 51 via a pressure line 52. The fluid inlet connects to an internal fluid manifold 53 which provides a fluid distribution system to the various bearing systems, in this case two, consisting of the thrust bearing and spool bearing. The fluid distribution system manifold is connected directly to passage 22 for supplying fluid at system pressure to inlet port 20 in the central portion of the barrel for the operation of the spool bearing, as previously described. Also, connected in the manifold to receive fluid from the supply system are two compensating units 54 which restrict the flow of fluid from the manifold to their outlets so that a pressure reduction will occur. These units are matched to one another and one unit is mounted in the base 14 and through its associated passage 55 vents its fluid outlet to between the circular spaced sills on one face of the thrust disc while the other compensating unit is mounted in a flange and its through passage 56 vents its fluid outlet to between the circular sills 43 on the opposite face of the thrust disc, as can be seen in FIG. 2.

These compensating units are shown as screw-in plug units having a central orifice of an appropriate size. Reference is made to my co-pending patent application Ser. No. 786,121, filed Dec. 23, 1968, and entitled "-Compensating Element For Hydrostatic Bearing" for description in greater detail of suitable compensating units of this type.

Since the orifice in each of the compensating units 54 are of equal size, the pressure on opposite sides of the disc will be identical so long as the clearance between the circular sills on the opposite radial faces of the disc remain equal to one another. If the disc moves axially to reduce the clearance on one side the pressure will build toward system pressure on that side, while the increase clearances on the opposite side will cause a pressure drop. These unequal pressures on the disc will urge it to return it to its centered position whereat the pressures will again balance. Obviously, this thrust bearing will work in both directions and, since it is not physically restrained in the radial direction and opening in the spacer 46 has a larger diameter than the thrust disc, the spool bearing will support the disc and operate in a satisfactory manner without any loadings from the thrust bearing.

In order to have a closed hydrostatic bearing system, which is desirable since it reduces problems in controlling the fluid passing through the several hydrostatic bearings, an integral drain system is provided in the cartridge spindle. In the spindle embodiment, illustrated in the FIG. 2, it includes a fluid drain system connected to outlet drain 61. This drain system has a manifold 61 which is connected to drain the hollow base 14 through passage 62, to drain around the periphery of the thrust disc 40 through opening 63 and to drain the relieved drain areas 33 located at each end of the spool bearing through passages 64 and 65 respectively. Passage 65 connects to a groove 66 which surrounds the relieved drain area at the arbor end of the spool. Between the arbor 67 and the adjacent drain area 33 is a fluid seal 68 in which an expanding seal ring member 69 is inserted to prevent the fluid from this drain area from venting into the arbor area. This seal is a rub seal and is of a conventional construction.

When the spool bearing is used in the spindle embodiment, as illustrated in FIG. 2, it is driven through a motor such as electric motor 11 and the connection between the motor shaft 70 and the driven end 41 of the shaft should be accomplished with a flexible coupling 71 in order to prevent any misalignment of these shafts from inducing loads on the spool bearing system. Also the coupling must be flexible both in an axial direction as well as compensating for misalignment in order for the thrust bearing to function properly. The flexible coupling illustrated in the drawing is of this type.

Referring to FIG. 6 an engine lathe 100 is illustrated which includes a bench or frame 101 on which a stationary head stock 102 is mounted. A carriage 103 is mounted on ways 104 of the frame and a turret 105 of the chucker carries a tracer assembly 106.

This tracer assembly is similar to the tracer assembly illustrated in U.S. Pat. No. 3,145,597 issued to Tydeman, except that the mounting is modified for effecting radial cuts and the tracer sensor or stylus is supported in a hydrostatic spool bearing, as more fully explained hereafter, to achieve improved performance.

In general the arrangement illustrated in FIG. 6 for the tracer assembly 106 is designed for face or radial cuts on a workpiece (disc) 107 which is carried by the rotating chuck 108 so it matches the profile of template 109 supported by the template mounting structure 110. This mounting structure is supported on a post 111 which is connected to the bench or frame 101 of the lathe and includes a crossbar 112 at its top that is fixedly mounted to the post. Mounted at the outboard end of the crossbar are two perpendicular adjustable slideways. A transverse slideway 113 is manually adjusted through knob 114 and a vertical slideway 115 is controlled through knob 116. Employing these two slideways, the template mounting plate 117 on which template 109 is mounted can be properly positioned relative to the tracing unit and workpiece for accomplishing various cuts. The slideways are constructed to eliminate all lost motion.

As illustrated in FIG. 6, tracer assembly or unit 106 is mounted on slide block 123 so the tracer sensor or stylus 120 and cutting tool 121, which is supported on a tool mount 122 will always maintain a constant relative relationship. Thus, once the tool, stylus and template have been properly adjusted relative to the workpiece 107, which is to be cut according to the template profile, the unit will continue to cut the workpieces to match the template profile. In FIG. 6 the cuts accomplished in the workpiece by using the tracer unit and the template are illustrated by broken lines 127 and match the profile of template 109.

In operation, the tracer unit 106 will control the position of the carriage 103 relative to the template 109 while slide block 123 is advanced slowly upwardly on ways 124 and guide 125 by the actuation of hydraulic jack 126 or manually. As a result, tool 121 will cut the profile of the template in the face of the workpiece. Since the workpiece is rotating with chuck 108, only one-half of the total profile need be reflected on the template for the cut illustrated.

A more detailed description of the operation of tracer units or assemblies can be found in U.S. Pat. No. 3,145,597 issued to Tydeman and the description of such tracer assembly described therein is incorporated in this application by reference for background information.

Commercially acceptable tracer units must guarantee a part-to-part and a part-to-template accuracy of approximately ±0.0002. To maintain such accuracy or to improve it the deflection and distortion of the stylus as it tracks across the profile of the template 109 must virtually be eliminated or reduced to the absolute minimum. Referring to FIG. 6, it can be appreciated that considerable oblique or side loadings are taken by the stylus as it tracks across the profile of the template. Such side loadings which may cause the stylus to distort and deflect will affect the position of the cutting tool relative to the stylus. Thus, the final part-to-template accuracy of the workpieces made with the tracer assembly or unit can greatly be impaired in such situations.

It can be appreciated the more irregular the profile of the template 109, the more difficult it will be for the stylus to trace its profile. Further, as the sharpness of the angles of the template profile increases, the greater the force on the stylus from these oblique or side loadings will be. As a result, the reciprocal bearing carrying the stylus must be extremely fluid under these conditions and not subject to sticking or irregular movement as the stylus traces the template profile. This has been a troublesome problem in prior art tracer assemblies.

To eliminate the problems of sticking and irregular bearing performance which supports the stylus 120, the above described spool bearing is employed as it will work as an axial reciprocating bearing as well as a rotating journal for a spindle shaft. In the former case, since the bearing is completely fluid, it can trace angles of an extremely sharp character with ease that would place too great of side loading on the bearing for the stylus of a conventional tracer assembly. The ability to make the hydrostatic spool bearing in extremely miniature form allows it to be employed in such applications with little or no difficulty. Since the hydrostatic spool bearing is stiff but fluid in its reciprocal movement, severe side loading on the stylus will not result in errors in positioning the cutting tool. This feature, coupled with the smooth, fluid axial reciprocation of the stylus supported on the spool bearing, insures greater accuracy in the tracing unit incorporating such a bearing to support its stylus.

In FIG. 7 the sensor unit 140 is shown in section and is conventional except for the hydrostatic spool bearing 141 which supports the sensor or stylus 120 whose point tracks on the profile of template 109. The reciprocation of the stylus as it tracks across the profile of the template operates a control valve 142 which causes carriage 103 to move toward or away from the workpiece 107 in response to stylus movement. This action moves the cutting tool toward or away from the workpiece as the stylus traces the profile in a direct relationship.

The control valve is not fully detailed in the instant application since it is identical with the control valve illustrated in U.S. Pat. No. 3,145,597 which issued to Tydeman. Reference is made to the above patent for disclosure and description of the control valve, which is illustrative of the very sensitive type of control valve employed in tracing assemblies.

All of these control valves must be highly sensitive to the reciprocal movement of the stylus 120 in order to achieve accuracies in the range of ±0.0001 inch or better in template-to-part match. Thus, if any deflection or distortion occurs in the stylus as it tracks on the template these accuracies will be reduced. Employing a hydrostatic spool bearing to support the stylus eliminates these deflection and distortion problems. Further, the hydrostatic spool bearing is a miniature hydrostatic bearing which now makes hydrostatic bearings employable in tracer assemblies which has been difficult with prior art devices.

With highly sensitive control valves, a stylus supported by the spool bearing will allow tracing capabilities within the range of ±0.00005 inch, even where the profile is quite irregular with sharp angles. Of course, this greatly improves both part-to-part and part-to-template accuracies over the accuracies achieved with conventional tracing assemblies.

Since the hydrostatic spool bearing does not wear, frequent adjustment or compensation of the bearing are totally unnecessary which eliminates time-consuming and troublesome problems currently found in many tracing assemblies. Many other advantages, and particularly the floating reciprocal movement of the stylus which eliminates sticking and jerking movement when the stylus encounters heavy side loadings, will also be apparent from this description of the invention.

As indicated earlier, the spool bearing functions identically whether in a rotating embodiment or in an axial reciprocating bearing embodiment. Obviously the only limit on the bearing is the speed of rotation or speed of reciprocation due to changes in the flow dynamics of the supporting fluid. Rotational speeds from 0 to 100,000 rpm are possible in the cartridge spindle employing the spool bearing and a spring stiffness in the range of 30 million pounds is conventionally employed, which is constant throughout the speed range. These same bearing characteristics in reciprocating embodiments are advantageous.

Since the spool bearing functions hydrostatically identically for that described for the spindle embodiment, the same numerals will be used to refer to its similar components parts and only a brief description of its operation will be undertaken. Basically the spool shaft 17, on which the squared base of the stylus 120 is mounted, has a reduced center section 23 which includes identical stepped lands 31 and 32 at its opposite ends. The spool shaft is reciprocally positioned in bore 20 of the stylus housing. The end of the shaft opposite the stylus will abut directly upon the control stem of valve 142 and a spring 143 between the housing and the stylus end of the spool shaft will urge it against the pin so that no lost motion will occur between these two elements. A spring upon the spool valve, which can be adjusted, develops sufficient force so the control element of the valve will follow the stylus as it reciprocates in the housing. On the stylus end of the spool shaft, the square head passes through the housing in a matched aperture which prevents this spool shaft from rotating. A recess in the end of the square stylus head allows various stylus points to be inserted therein which are locked in place with set screws. In operation, hydraulic fluid will enter through inlet 20 and pass across the several lands at opposite ends of the spool shaft to drain areas from which it will return to its reservoir.

In view of the foregoing description of the operation of the spool bearing in a spindle environment, it is felt unnecessary to further discuss its operation in the stylus embodiment. However, it should be appreciated that the flow of the fluid past the lands actually floats the spool in the bore so that it reciprocates smoothly on a flowing film of fluid and makes no contact with bore 21. As a result, the use of this assembly in tracing elements provides highly accurate tracing through which superior performance can be achieved in machine tracer assemblies.

We claim:

1. In combination with a tracer assembly having a stylus for tracking the profile of a template and operable to actuate a servo-controlled positioning tool to reproduce the template profile in a workpiece, a hydrostatic stylus bearing comprising
- a housing for supporting said stylus for reciprocal movement in its bore;
- a bearing spool reciprocally mounted in said bore, said bearing spool having a reduced diameter central portion and stepped lands on opposite sides of said central portion;
- said stylus being mounted on one end of said bearing spool;
- a control servo associated with the opposite end of said bearing spool;
- a fluid inlet in said housing communicating with its bore in a location between said stepped lands whereby pressurized fluid entering through said fluid inlet and egressing between said lands and the wall of said bore will support said bearing spool on a hydrostatic bearing;
- a source of pressurized fluid connected to said inlet; and
- biasing means acting on said bearing spool to urge said stylus against the profile of a template whereby smooth, error-free tracking on said profile by said stylus will be achieved.

2. The combination as defined in claim 1 wherein the control servo is a sensitive hydraulic control valve.

* * * * *